(12) United States Patent
Neckel

(10) Patent No.: US 7,748,677 B2
(45) Date of Patent: Jul. 6, 2010

(54) RESILIENTLY FLEXIBLE HANGER SYSTEM

(76) Inventor: Eric Alexus Neckel, 6317 N. County Rd. 29C, Bellvue, CO (US) 80512

( * ) Notice: Subject to any disclaimer, the term of this patent is extended or adjusted under 35 U.S.C. 154(b) by 823 days.

(21) Appl. No.: 11/237,145

(22) Filed: Sep. 27, 2005

(65) Prior Publication Data
US 2007/0069095 A1 Mar. 29, 2007

(51) Int. Cl.
*A47G 23/02* (2006.01)
(52) U.S. Cl. .................. 248/302; 248/304; 248/339
(58) Field of Classification Search ................. 248/304, 248/306, 339, 302, 303, 305
See application file for complete search history.

(56) References Cited

U.S. PATENT DOCUMENTS

| | | | | |
|---|---|---|---|---|
| 1,487,085 A | * | 3/1924 | Blackshear | 211/65 |
| 2,014,971 A | * | 9/1935 | Knutson | 248/73 |
| 2,366,456 A | * | 1/1945 | Pheazey | 248/73 |
| 3,085,716 A | * | 4/1963 | Trattler | 222/93 |
| D283,289 S | * | 4/1986 | Hazenbroek | D7/368 |
| D332,391 S | | 1/1993 | Szymanski | |
| 5,788,201 A | * | 8/1998 | Hardison | 248/302 |
| 6,244,545 B1 | * | 6/2001 | McCrary | 248/73 |
| D483,655 S | * | 12/2003 | Dretzka | D8/367 |
| 6,736,356 B1 | * | 5/2004 | Murphy | 248/112 |
| 6,749,165 B2 | * | 6/2004 | Immerman | 248/304 |
| 7,025,309 B2 | * | 4/2006 | Goodwin et al. | 248/74.4 |

* cited by examiner

*Primary Examiner*—J. Allen Shriver, II
*Assistant Examiner*—Steven M. Marsh
(74) *Attorney, Agent, or Firm*—Craig R. Miles; CR Miles, P.C.

(57) ABSTRACT

A compressed gas cylinder hanger having resiliently flexible engagement with the neck of the compressed gas cylinder to fix or resist rotation of the compressed gas cylinder hanger about neck.

5 Claims, 2 Drawing Sheets

RESILIENTLY FLEXIBLE HANGER SYSTEM

I. BACKGROUND

A compressed gas cylinder hanger provides resiliently flexible engagement with the neck of a compressed gas cylinder.

Compressed and liquefied gases are routinely used in manufacturing, research and various other operations. A numerous and wide variety of compressed and liquefied gases such as helium, nitrogen, air, argon, carbon dioxide, acetylene, and the like can be obtained in compressed gas cylinders configured as shown by FIG. 1. Compressed gas cylinders can for example comprise a compressed gas cylinder (1) having an outside diameter of about nine inches in and a standing height of about 51" to the bottom of a cylinder neck (2) (although larger and smaller cylinders can be obtained). The top of the compressed gas cylinder (1) terminates in cylinder neck (2) having an outside diameter of about two to about three inches and a height of about one inch to two inches. A gas cylinder valve (3) coupled to the cylinder neck (2) operates to regulate the flow of compressed gas (not shown) contained inside of the compressed gas cylinder (1). A cylinder cap (4) removably engages the cylinder neck (2)(typically by mated spiral threads) to provide a protective enclosure for the cylinder valve (3). The gas cylinder valve (3) is typically configured to couple with a gas regulator (5) which further adjusts gas flow from the interior of the compressed gas cylinder (1). A variety of gas conduits (6) whether flexible (as shown by the example of FIG. 1) or inflexible can be coupled to the gas regulator (5) in which a gas flow can be generated from the interior of the metal cylinder (1) to various instruments or tools (7), such as the welding torch shown in FIG. 1.

Even though there is large commercial market which utilizes compressed gas contained in compressed gas cylinders (1) a common problem for users of compressed gases contained in compressed gas cylinders (1) can be storage of the cylinder cap (4) once disengaged from the cylinder neck (2). Typically, the loose cylinder cap(s) (4) are placed on the floor next to the compressed gas cylinder. However, the loose cylinder caps (4) present a danger to persons working about the compressed gas cylinders (1) because the loose cylinder caps (4) are not typically secured at a location on the floor out of the walk path. As such, the loose cylinder caps (4) even when set outside of the walk path can be urged into the walk path by contact, or can roll from location to location on the floor into the walk path, which in either event can pose a hazard to persons who may trip over the loose cylinder caps (4). Additionally, loose gas cylinder caps (4) are prone to loss and can be expensive to replace.

Another significant problem related to the use of compressed gas cylinders (1) can be the lack of storage means for flexible conduit (6) coupled to the gas regulator (5), or other tools or materials used in association with the compressed gas. As shown by FIG. 1, flexible conduit connected to the gas regulator (5) can be many feet long to provide gas flow to the attached tool (7). Typically, the flexible conduit (6) remains coupled to the gas regulator (5) even when the tool (7) is not being used with the flexible conduit (6) and may be coiled or otherwise configured for storage next to the compressed gas cylinder (1). However, the flexible conduit (6)(or other materials or tools) may not be secured in storage and can remain in the walk path or urged into walk path by contact, which in either event can pose a hazard to persons who may trip over the flexible conduit (6)(or other materials or tools).

One attempt to address the problem of unsecured cylinder caps (4) has been described by U.S. Pat. No.: Des. 332,291 which shows the ornamental design of an industrial gas cylinder cap hanger having a ring member which can be located about the cylinder neck (4) of a compressed gas cylinder (1) from which a single member extends. However, this approach presents certain additional unresolved problems. First, the ring member once placed about the cylinder neck (4) can freely rotate about the longitudinal axis of compressed gas cylinder which fails to fix the location of the member or resist re-location of the member about the compressed gas cylinder. Second, the member has the narrow utility of engaging the interior surface of the cylinder cap (4). However, the hanger member described may not be suitable to engage the coils of flexible conduit (6)(or other tools or materials) because the surface area presented by the hanger member used to engage the cylinder cap (4) may damage a flexible conduit (6) because the weight of the flexible conduit (6) may not be disseminated over a sufficient exterior surface area to prevent the flexible conduit (6) from being deformed in a manner which effects gas flow within the conduit during subsequent use or damages the wall material of the flexible conduit (6) (such as by establishing a kink in the flexible conduit which both reduces cross sectional area of the conduit and damages the flexible conduit wall).

The present invention provides a practical solution to the above-mentioned problems.

II. SUMMARY OF THE INVENTION

Accordingly, a broad object of the invention can be to provide a compressed gas cylinder hanger having resiliently flexible engagement with the neck of a compressed gas cylinder to fix or resist rotation of the compressed gas cylinder hanger about the longitudinal axis of the cylinder neck.

A second broad object of the invention can be to provide a compressed gas cylinder hanger having resiliently flexible engagement with the neck of a compressed gas cylinder which further provides a hanger member configured to secure a cylinder cap.

A third broad object of the invention can be to provide a compressed gas cylinder hanger having a hanger member configured to secure coils of a flexible conduit without damage to the flexible conduit.

Naturally, further objects of the invention are disclosed throughout other areas of the specification, drawings, photographs, and claims.

III. A BRIEF DESCRIPTION OF THE DRAWINGS

IV. DETAILED DESCRIPTION OF THE PREFERRED EMBODIMENTS

A compressed gas cylinder hanger having resiliently flexible engagement with the neck of the compressed gas cylinder to fix or resist rotation of the compressed gas cylinder hanger about neck.

Figure 1:
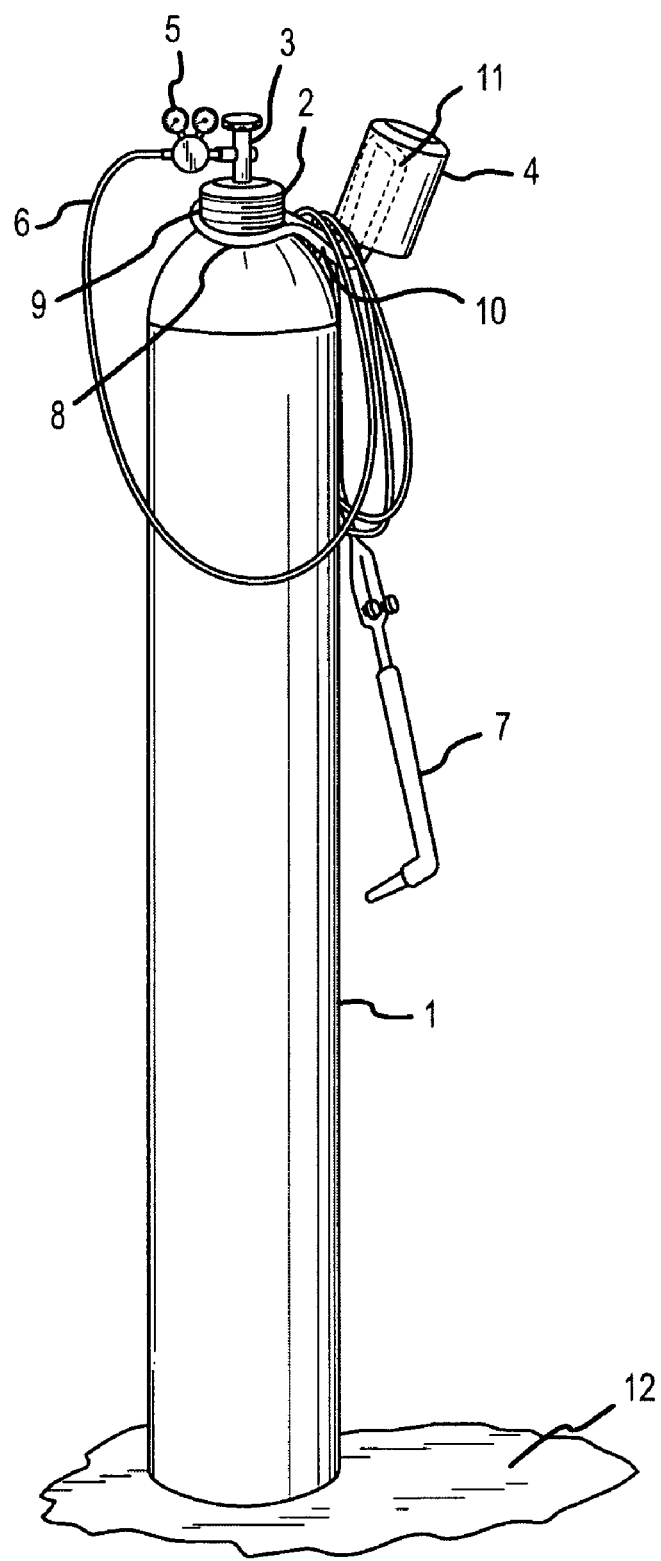
FIG. 1 shows a method of using a particular embodiment of the compressed gas hanger invention.

First referring to primarily to FIG. 1, a preferred method of using the compressed gas cylinder hanger (8) is illustrated. By engaging a resiliently flexible collar (9) of the compressed gas cylinder hanger (8) invention with a cylinder neck (2) of the compressed gas cylinder (1), and by then applying sufficient force to the resiliently flexible collar (9), an amount of flexure can be generated in the resiliently flexible collar (9). Then by forcibly urging the resiliently flexible collar (9) to slidingly engage the exterior surface of the cylinder neck (2) of the compressed gas cylinder (1), the resiliently flexible collar (9) can be established about the cylinder neck (2) of the compressed gas cylinder (1) as shown. In a further step, rotating the resiliently flexible collar (2) about the cylinder neck (2) locates the hanger member (10) at the desired position. Inserting a cap securement portion (11) of the hanger member (10) inside of the cylinder cap (4) locates the cylinder cap (4) a distance above the floor surface (12). Then by coiling flexible conduit (6) about the remaining portion of the hanger member (10), the flexible conduit (6) can be stored above the floor surface (12) along with any attached tool(s) (7). It is to be understood that the preceding description is not intended to limit the invention to use to a particular configuration of compressed gas cylinder, gas regulator, gas conduit, instruments, tools or type of compressed gas. Rather it is intended that the method be illustrative of the numerous and varied configurations of compressed gas cylinders with which the invention can be utilized.

Figure 2:
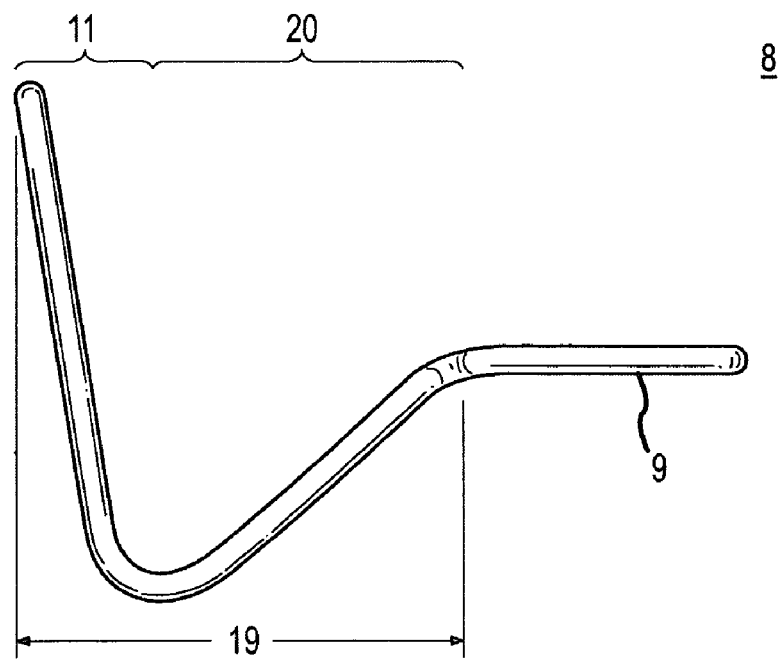
FIG. 2 shows a side view of a particular embodiment of the compressed gas hanger invention.
Figure 3:
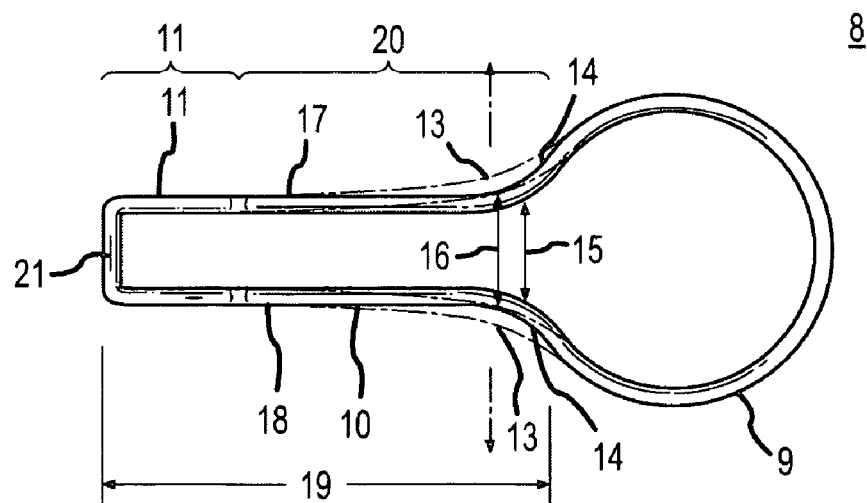
FIG. 3 shows a top view of a particular embodiment of the compressed gas hanger invention having a resiliently flexible collar.

Now referring primarily to FIGS. 2 and 3, a preferred embodiment of the compressed gas cylinder hanger (8) can include the resiliently flexible collar (9). As shown in FIG. 3, the resiliently flexible collar (9) can be configured to provide an amount of flexure (13) in response to the amount of force exerted by the person forcibly urging the resiliently flexible collar (9) onto the cylinder neck (2) of the compressed gas cylinder (1). While FIGS. 2 and 3, show the resiliently flexible collar (9) configured as a discontinuous metal ring of substantially circular cross section which disposes a pair of ring ends (14) a first distance apart (15), it is to be understood that the resiliently flexible collar (9) can be any configuration which provides sufficient flexure upon forcible urging of a person to allow sliding engagement with the exterior surface of the cylinder neck (2). For example, an alternate embodiment of the resiliently flexible collar (9) can provide discontinuous resiliently flexible band having a substantially square or rectangular cross section.

The preferred embodiment of the compressed gas cylinder hanger (8) shown by FIGS. 2 and 3 can be produced from metal or plastic rod having a diameter of between about one quarter inch and about three eighths inch, although other materials could also be utilized including polymers of hexamethylene amine and adipic acid which contain the recurring amide group CONH, or composite materials which use fibers or strands held in a thermoplastic material such as epoxy, spring steel, or the like. The amount of flexure generated in the preferred embodiment of the invention can dispose the pair of ring ends (14) a second distance apart (16) with the difference between the first distance apart (15) and the second distance apart (16) being between about one-sixteenth inch to about one-eighth inch; however as above mentioned the increase in distance between the pair of ring ends (14) need only be sufficient to allow sliding engagement of the resiliently flexible collar (9) with the exterior surface of the cylinder neck (2). Conversely, upon disengagement of the resiliently flexible collar (9) from the cylinder neck (2), the preferred embodiment of the invention has sufficient resiliency to return the pair of ring ends (14) from the second distance apart (16) to substantially the first distance apart (15).

Again referring primarily to FIGS. 2 and 3, the compressed gas cylinder hanger (8) can further include a hanger member (10) coupled to the resiliently flexible collar (9). In the preferred embodiment of the invention shown, the hanger member (10) comprises a pair of hanger members (17)(18) each coupled to a corresponding one of said pair of ring ends (14). This coupling can be produced by configuring a rod to provide both the resiliently flexile collar (9) and the pair of hanger members (17)(18) as a single integral piece as shown, or by coupling discrete pieces to the resiliently flexible collar (9) by welding or by mechanical fasteners, or the like. As to alternate embodiments of the invention, the hanger member can comprise any of numerous and varied configurations of the hanger member (10) coupled to the resiliently flexible collar (9). For example, the hanger member (10) can be configured as a single rod, blade of metal, or hollow pipe coupled to the resiliently flexible collar (9) such that it extends outwardly to accept coils of flexible conduit (6) or other materials or tools.

The hanger member (10) of the preferred embodiment shown by FIGS. 1, 2, and 3 can be configured to provide a first hanger member portion (20) and a cap securement portion (11). The first hanger portion (20) can be generated in numerous and varied configurations to allow securement of a variety of materials or tools between the resiliently flexible collar (9) and the cap securement portion (11). One illustrative configuration shown by the Figures provides a first hanger portion (20) which can function to hold or store coils of the flexible conduit (6); however, this illustrative configuration is not intended to be limiting with respect to the kind or type of flexible conduit, materials or tools which can be secured by alternate configurations of the first hanger portion (20) which can further include pockets, containers, slots, or the like. As to certain embodiments of the invention, the first hanger portion (20) can be omitted in part or in the entirety depending on the application of the particular embodiment of the compressed gas container hanger (8).

The cap securement portion (11) of the hanger member (10) can be generated by angling a portion of the hanger member (10) upwardly as shown by FIGS. 1 and 2, or at any angle sufficient to allow the cap securement portion (11) to insert inside the cylinder cap (4) as shown by FIG. 1 to locate the cylinder cap (4) a distance above the floor surface (12). A preferred embodiment of the invention establishes the longitudinal axis of the cap securement portion (11) substantially perpendicular to the floor surface (12) (or within 20 degrees of perpendicular to the floor surface) when the resiliently flexible collar (9) engages the cylinder neck (2) in the operable condition. As to certain embodiments of the invention, the cap securement portion (11) can be omitted, or as to alternate embodiments of the invention, the cap securement portion (11) can be directly coupled to the resiliently flexible ring (9). As those embodiments of the invention which provide a pair of hanger members (17)(18) which make up the cap securement portion (11), a further cross piece (20) can be include which couples to the corresponding ends of each of the pair of hanger members (17)(18).

As can be easily understood from the foregoing, the basic concepts of the present invention may be embodied in a variety of ways. The invention involves numerous and varied embodiments of a resiliently flexible compressed gas hanger and methods of making and using such resiliently flexible compressed gas hanger.

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "cap" should be understood to encompass disclosure of the act of "capping"—whether explicitly discussed or not—and, conversely, were there effectively disclosure of the act of "capping", such a disclosure should be understood to encompass disclosure of a "cap" and even a "means for capping." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the compressed gas cylinder hangers herein described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A compressed gas cylinder hanger, comprising:
   a. a unitary member which includes a discontinuous ring element of generally circular configuration which disposes one pair of ring ends a first distance apart;
   b. a hanger member including a pair of hanger members each having a length disposed between a first member end and a second member end, each of said first member ends correspondingly connected to a corresponding one of said pair of ring ends to locate each of said pair of hanger members in generally parallel relation spaced said distance apart, each of said pair of hanger members having a first hanger portion proximate said discontinuous ring element which angles downwardly and a second hanger portion distal from said discontinuous ring which angles upwardly, said second hanger portion configured to insert into a cylinder cap of a compressed gas cylinder;
   c. a tie piece having a length disposed between a pair of tie piece ends each one of said tie piece ends connected to a corresponding one of said second member ends, said unitary member having sufficient resilient flexure upon forcible engagement of said discontinuous member with a neck of said compressed gas cylinder to dispose said one pair of ring ends a second distance apart sufficient to engage said discontinuous ring element about said neck of said compressed gas cylinder.

2. A compressed gas cylinder hanger as described in claim 1, wherein said first hanger portion has a hanger surface which allows removable engagement of a plurality of coils of a flexible conduit.

3. A compressed gas cylinder hanger as described in claim 1, wherein said discontinous ring has a sufficient amount of resilient flexure upon forcible disengagement with said neck of said compressed gas cylinder to return said pair of ring ends to said distance apart.

4. A method of coupling a compressed gas cylinder hanger of claim 1 to a compressed gas cylinder, comprising the steps of:
   a. providing a unitary member of claim 1;
   a. engaging a discontinuous ring member of said unitary member with a neck of said compressed gas cylinder hanger;
   b. applying sufficient force to said discontinuous ring member engaged with said neck of said compressed gas cylinder to generate an amount of flexure in said unitary member;
   c. forcibly urging said discontinuous ring member to slidingly engage about said neck of said compressed gas cylinder; and
   d. locating said discontinuous ring member of said unitary structure about said neck of said compressed gas cylinder.

5. A method of producing a compressed gas cylinder hanger of claim 1, comprising the steps of:

a. providing a discontinuous ring element of generally circular configuration which disposes pair of ring ends a distance apart;
b. connecting to each of said pair of ring ends a corresponding one of a pair of hanger members each having a length disposed between a first member end and a second member end to locate each of said pair of hanger members in generally parallel relation spaced said distance apart, each of said pair of hanger members having a first hanger portion proximate said discontinuous ring element which angles downwardly and a second hanger portion distal from said discontinuous ring which angles upwardly, said second hanger portion configured to insert into a cylinder cap of a compressed gas cylinder;
c. connecting a tie piece between said second member ends, thereby producing a unitary member having sufficient resilient flexure upon forcible engagement with a neck of said compressed gas cylinder to dispose said one pair of ring ends a second distance apart sufficient to engage said discontinuous ring element about said neck of said compressed gas cylinder.

* * * * *